United States Patent [19]

Nitschmann et al.

[11] 4,385,442
[45] May 31, 1983

[54] PORTABLE POWER CHAIN SAW

[75] Inventors: Karl Nitschmann, Schorndorf; Günter Weidmann, Stuttgart, both of Fed. Rep. of Germany

[73] Assignee: Andreas Stihl, Waiblingen, Fed. Rep. of Germany

[21] Appl. No.: 229,129

[22] Filed: Jan. 28, 1981

[30] Foreign Application Priority Data

Feb. 8, 1980 [DE] Fed. Rep. of Germany ....... 3004588

[51] Int. Cl.³ ............................................. B27B 17/00
[52] U.S. Cl. ..................................... 30/382; 188/1.11
[58] Field of Search ........................ 30/381, 382, 383; 188/77 R, 77 W, 166, 1.11; 116/200

[56] References Cited

U.S. PATENT DOCUMENTS

| 3,398,246 | 8/1968 | Linet | 188/1.11 X |
| 3,664,390 | 5/1972 | Mattsson | 30/381 |
| 3,991,469 | 11/1976 | Frederickson | 30/383 |
| 4,121,339 | 10/1978 | Nikolich | 30/383 X |
| 4,152,833 | 5/1979 | Phillips | 30/382 |
| 4,246,701 | 1/1981 | Johansson | 30/382 |
| 4,324,045 | 4/1982 | Hoppner | 30/383 |

Primary Examiner—Jimmy C. Peters
Attorney, Agent, or Firm—Becker & Becker, Inc.

[57] ABSTRACT

A portable power chain saw with a safety device to protect against kick-back or recoil movements of the saw. The power chain saw has a handle, a finger guard which is arranged between the handle and the saw chain and acts as an inertial mass, as well as a blocking device which actuates the safety device at the beginning of a kick-back movement. The chain saw also includes a monitoring device, which responds to an operating condition of the chain saw impairing the safety of use thereof by an operator, and which is in effective connection with an indicating device. An auxiliary device may additionally be provided for actuating the safety device, and this auxiliary device is releasable by the monitoring device and ultimately brings the saw to a standstill.

9 Claims, 6 Drawing Figures

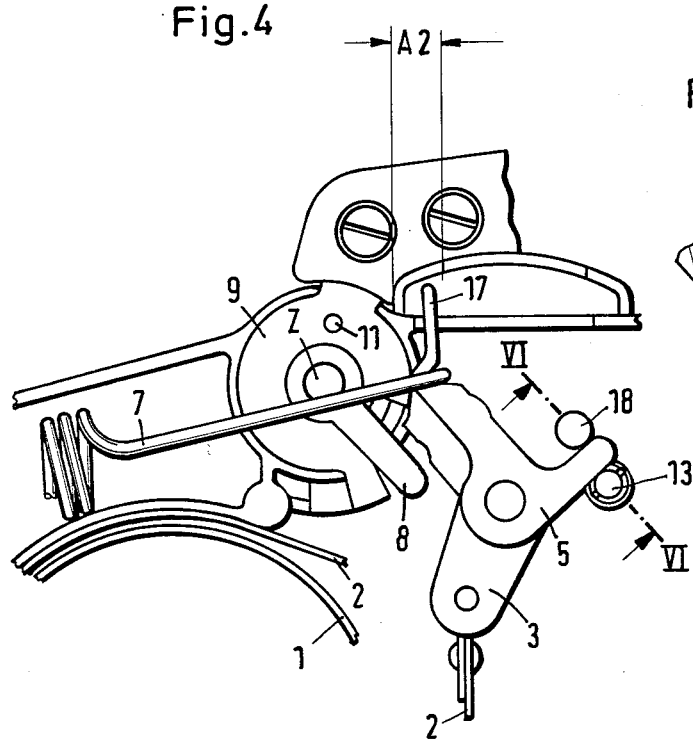
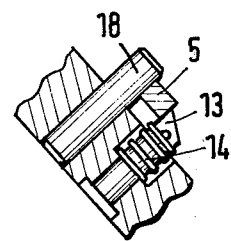

PORTABLE POWER CHAIN SAW

The present invention relates to a portable power chain saw with a safety device as protection against centrifugal, recoil, or kick-back movements of the saw. The power chain saw has a handle, a finger guard which is arranged between the handle and the saw chain and acts as an inertial mass, as well as an arresting or blocking device which at the beginning of a recoil movement actuates the safety device.

Power chain saws are already known with which the safety device includes a brake and a pretensioned storage spring. This spring is held by the blocking device in its pretensioned position until a recoil movement begins and the blocking device releases the storage spring which then brings the brake band into engagement against a brake drum connected with a drive wheel or sprocket of the saw chain. Due to such a braking process, the saw chain is brought to a standstill in the shortest time, so that the danger of accidents cannot occur.

The operator using a power chain saw equipped with such a safety device generally counts on the safety device to function for the duration of the operating life of the power chain saw. For this reason, it is necessary that the reliable functioning and/or the response accuracy of the safety device is assured at least for as long as the chain saw is operational.

Since these safety devices must respond extremely accurately, and thus are correspondingly constructed, an extremely high precision is required when producing all of the elements belonging to such a safety device. Naturally however, the chain saw, as a consequence of its different ways of use and application, is also subjected to such stresses which are not foreseeable in spite of a careful production and finishing, and consequently might lead to a premature failure of the safety device. Such a premature failure can, aside from occurring due to excessive wear, for example caused by careless or inattentive actuation or a rough manner of operation, also occur due to extraordinary streeses on the entire saw, for example caused by extremely high temperatures or particularly heavy accumulations of dirt.

It is an object of the present invention to make sure, by means of structural elements, that, after the occurrence of an operating condition impairing the reliability of the safety device, the operator is adequately warned.

This object, and other objects and advantages of the present invention, will appear more clearly from the following specification in connection with the accompanying drawings, in which:

FIG. 4 shows the monitoring device, which is associated with the safety braking device, when the brake band has failed;

FIG. 5 shows the monitoring device, when the brake spring has failed; and

FIG. 6 shows a short circuiting device in section taken along line VI—VI in FIG. 4.

Figure 1:
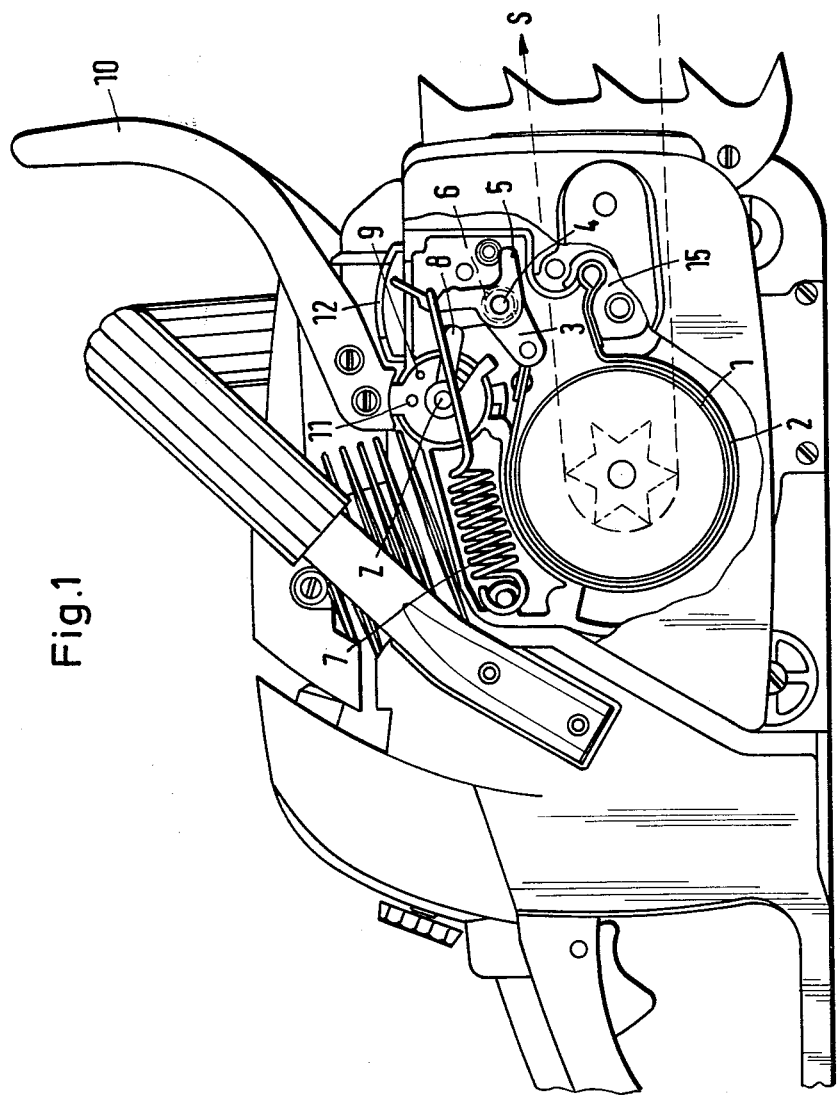
FIG. 1 is an overall side view of a portable power chain saw with a safety braking device and the inventive monitoring device for this safety braking device.

The chain saw of the present invention is characterized primarily by a monitoring device, which responds to a condition of operation of the chain saw impairing the safety thereof and which is in effective connection with a signalling or indicating device.

Such a monitoring or indicating device, for example, can be mechanically effective. In this case, a shiftable or pivotable indicator lever can be provided which, when a certain tolerance limit is exceeded, clearly warns the operator that the safety device no longer operates properly.

The signalling or indicating device can also operate pneumatically or electrically, or electronically by way of short circuit switching and the like, in such a manner that for example an acoustic or visual device is actuated, for example by lighting a warning light or the like.

In a further embodiment of the present inventive concept, provision can be made that, upon attaining the safety limit and indication thereof by the monitoring device and its indicating device, independently thereof an auxiliary device is actuatable which in turn connects or actuates the safety device, particularly a braking device of the initially described type, and moreover independently of whether or not the controlling procedure was released by the monitoring device or by the safety device itself.

Such an additional and independently working actuating device thus represents a type of servo-device which responds or reacts when the anyhow present safety device, for the above indicated reasons, no longer responds automatically in the case of danger, and which most of all then becomes effective when the above mentioned tolerance limit is exceeded. The monitoring device can be so embodied that it definitely stops the operation of the power saw, so that the user of the saw is forced to bring it to a service shop for inspection and repair.

Above all, also the failure of individual parts which belong to the safety device, as for example failure of the tension spring actuating the brake band or failure of the brake band itself, belong to the previously mentioned failure phenomena which can be encountered and go unnoticed during operation of the power chain saw.

The monitoring device may be associated with the blocking device. In particular, the monitoring device may be adapted or matched to the response accuracy of the blocking device. The monitoring device may also be associated with the safety device.

The safety device may comprise a brake band, which cooperates with a clutch or coupling drum of the saw chain, as well as a dual-arm operating lever, which is pivotally journalled on a pin or bolt secured to the housing, and is connected with the brake band and is braced against the tension of a brake spring by a drag lever coupled with the finger guard.

Aside from the operating lever, a control lever may be pivotally journalled on the pin or bolt, and may be positively connected with the operating lever by a torsion spring which, upon failure of the brake band or of the brake spring, seeks to move the control lever into a short circuit position for the ignition device of the internal combustion engine driving the power saw.

An indicator arm may be connected with the control lever, and this indicator arm is adjustable, particularly pivotable, in a situation which impairs the operating safety, to be moved out of a safety range into an unsafe range. The torsion spring may be arranged between the operating lever and the control lever, and may be embodied as an auxiliary device which, upon failure of the brake spring, presses the brake band against the clutch.

Referring now to the drawings in detail, the power chain saw illustrated in FIG. 1 has a conventional construction and is equipped with a safety braking device which stops or switches off the chain saw when the saw chain jams and consequently initiates a centrifugal recoil, or kick-back movement of the saw directed against the operator.

In detail, this safety braking device comprises a clutch or coupling drum 1 and a brake band 2 which surrounds the clutch drum 1. One of the two ends of the brake band 2 is fastened to the motor housing 15 of the power chain saw. The other end of the brake band 2 is fastened to an operating lever 3 which is pivotally journalled on a pin or bolt 4 secured to the housing. A control lever 5 is placed on the operating lever 3, and the control lever 5 is likewise pivotally journalled on the pin 4. The operating lever 3 and the control lever 5 are positively coupled with each other by a pretensioned spring clip or operating lever spring (leg spring) 6 which is wrapped around the pin 4. At the other end of the operating lever 3 and of the control lever 5, there is suspended a brake spring 7, which in the illustrated non-braking position is kept tensioned by a drag lever 8 and is held or secured in the illustrated release position by a locking or arresting recess. The safety braking device additionally comprises a second control lever 9 which is rotatably journalled on a support pin Z secured to the housing and which is screwed to a finger-guard lever 10 acting as inertial mass. The control lever 9 is pressed against the drag lever 8 by a non-illustrated leg spring which is seated on a shaft 11.

When, at the beginning of a kick-back movement of the power chain saw, the guard lever 10, as a consequence of its inertia, is swung or pivoted clockwise relative to the upwardly directed kick-back movement of the saw chain S, the drag lever 8 leaves the notch 16 (FIG. 3) provided on the operating lever 3 and thereby releases the operating lever 3 in such a manner that the latter, under the influence of the brake spring 7, is pivoted or swung counterclockwise and in so doing brings the brake band 2 into engagement with the clutch drum 1, whereby the clutch drum 1, and consequently also the saw chain S, are brought to a standstill.

The control lever 5 simultaneously serves as an indicator lever for an optical or visual indicator 12 of the inventive monitoring device which is described in greater detail in the following paragraphs.

Figure 2:
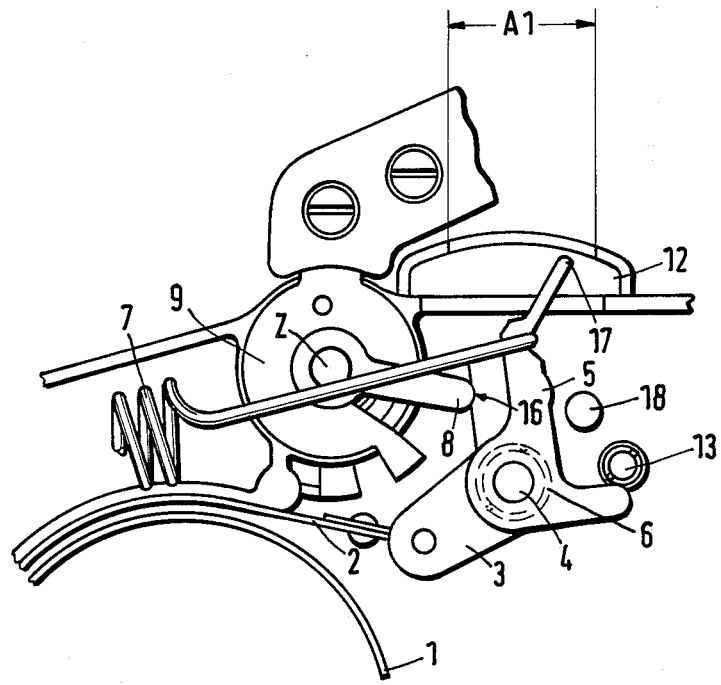
FIG. 2 shows the safety braking device in detail in the released position.

In FIG. 2, the above-described safety braking device is illustrated in detail in its release or non-braking position, and simultaneously there is shown the monitoring device. An indicator arm 17 is formed onto the control lever 5. With the ready and release position of the safety braking device represented in FIG. 2, this indicator arm 17 is located in the indicating range A1 of the optical or visual indicator device, thereby indicating the proper functioning of the safety braking device.

Figure 3:
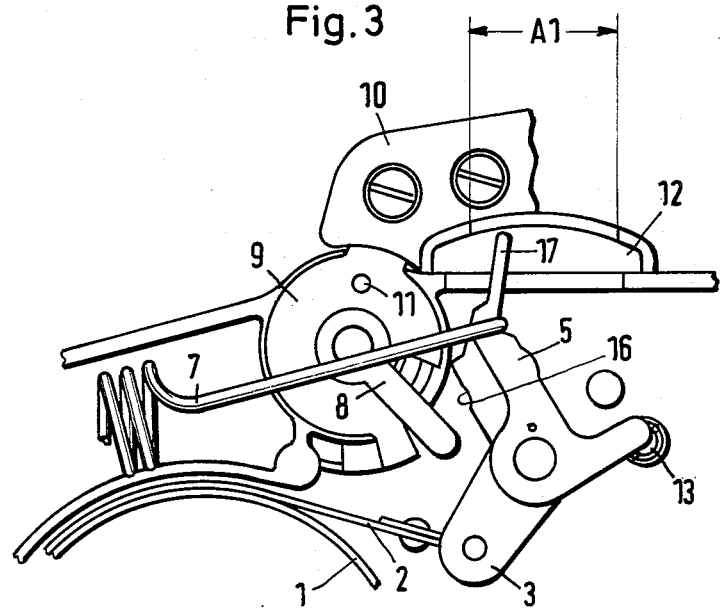
FIG. 3 shows the safety braking device in detail, in its braking position.

The braking position of the safety braking device shown in detail in FIG. 3 is attained when the finger-guard lever 10 pivots the control lever 9 in a clockwise direction and thereby presses the drag lever 8 out of the locking or arresting notch 16. The coil or helical brake spring 7 is then relieved and takes along the operating lever 3 and the control lever 5, whereby the lever 3 tensions the brake band 2 which then engages the clutch drum 1 and brakes the drive motor of the chain saw. The control lever 5, and the indicator arm 17 connected therewith, are now likewise located in the indicating range A1 of the visual indicator of the monitoring device.

FIG. 4 shows the position of the inventive monitoring device for the situation in which the brake band 2 fails and a proper functioning of the safety braking device is no longer assured. The operating lever 3 and the control lever 5 are pressed against the control lever 9 by the brake spring 7. The indicator arm 17 then moves into the range A2, thus indicating to the operator that the brake band 2 has broken or failed. Simultaneously, as shown in FIG. 6, the control lever 5 short circuits the ignition device of the internal combustion engine serving as the drive motor, with such short circuiting occurring by way of a bolt or pin 18. This has as a consequence that the internal combustion engine is brought to a standstill in the shortest time possible. Although the operating lever 3 can again be brought into the illustrated release position shown in FIGS. 1 and 2 by the guard lever 10, the control lever 9, and the drag lever 8, whereby the tensioning force is increased by the leg spring 6, the internal combustion engine can no longer be started since a snap closure, comprising a bolt 13 and a pressure spring 14, holds the control lever 5 securely pressed against the pin 18 in the manner shown in FIG. 6.

FIG. 5 shows the position of the inventive monitoring device when the brake spring is broken. In this case, the control lever 5 is tightly engaged against the pin 18 by the leg spring 6. As a result, the ignition device of the internal combustion engine is short circuited. The indicator arm 17 of the control lever 5 then moves into the region A3 and indicates to the operator that the brake spring has failed. Since the leg spring 6 is still pretensioned when the control lever 5 engages the pin 18, the operating lever 3 is actuated. The brake band 2 is then placed against the clutch drum or coupling drum 1 by the lever 3, which results in an additional braking of the drive motor which is coming to a standstill.

The special advantage of the present inventive monitoring device consists therein that the optical indicating device, not only upon failure of the brake spring 7 but also upon failure of the brake band 2 or of other components of the safety device, indicates that failure has occurred and additionally permits one to recognize from the outside which type of malfunction has occurred.

The present invention is, of course, in no way restricted to the specific disclosure of the specification and drawings, but also encompasses any modifications within the scope of the appended claims.

What we claim is:

1. A portable power chain saw, with a saw chain, comprising:
   a safety device to protect against recoil movements of the saw;
   a handle;
   a finger guard, which is arranged between said handle and said saw chain and acts an an inertial mass;
   an arresting device, which actuates said safety device at the beginning of a recoil movement;
   a monitoring device, which responds to an operating condition of said chain saw which impairs the safe operation thereof; and
   an indicator operatively connected with said monitoring device, an additional auxiliary device for actuating said safety device, said auxiliary device being releasable by said monitoring device for ultimately bringing said saw to a standstill, a housing, a pin secured to said housing, and a clutch for said saw chain, said safety device comprising a brake band which cooperates with said clutch, a dual-arm operating lever which is pivotally supported on said pin, a brake spring secured to said housing, a drag lever coupled with said finger guard, said operating lever being connected with said brake band and being braced against the tension of said brake spring by said drag lever, a control lever pivotally supported on said pin, and a torsion spring for positively connecting said control lever to said operating lever, said torsion spring, upon failure of one of said brake band and said brake spring, seeking to move said control lever into a short circuit position for an ignition device of the internal combustion engine which drives said chain saw.

2. A chain saw according to claim 1, in which said indicator is mechanically effective.

3. A chain saw according to claim 2, in which said indicator includes a movable indicator lever.

4. A chain saw according to claim 1, in which said monitoring device is associated with said arresting device.

5. A chain saw according to claim 4, in which said monitoring device is matched to the response accuracy of said arresting device.

6. A chain saw according to claim 1, in which said monitoring device is associated with said safety device.

7. A chain saw according to claim 1, which includes an indicator arm connected to said control lever, said indicator arm, when a situation impairing the operating safety of said chain saw exists, being movable out of a range visually indicating safe operation, to a range visually indicating unsafe operation.

8. A chain saw according to claim 7, in which said torsion spring is arranged between said operating lever and said control lever, forms said auxiliary device, and presses said brake band against said clutch upon failure of said brake spring.

9. A portable power chain saw, with a saw chain comprising in combination:

a safety device to protect against recoil movements of the saw;

a handle;

a finger guard, which is arranged between said handle and said saw chain and acts as an inertial mass;

an arresting device, which actuates said safety device at the beginning of a recoil movement;

a monitoring device which monitors functional capability of said safety device itself rather than that of the power chain saw and thereby responds to an operating condition of said chain saw which impairs the safe operation thereof;

an indicator operatively connected with said monitoring device which is triggered during an operating condition influencing response accuracy and functioning therewith, an additional auxiliary device for actuating said safety device, said auxiliary device being releasable by said monitoring device for ultimately bringing said saw to a standstill, a housing, a pin secured to said housing, and a clutch for said saw chain, said safety device comprising a brake band which cooperates with said clutch, a dual-arm operating lever which is pivotally supported on said pin, a brake spring secured to said housing, and a drag lever coupled with said finger guard, said operating lever being connected with said brake band and being braced against the tension of said brake spring by said drag lever.

* * * * *